Jan. 13, 1970     G. F. CHESNOV     3,488,965

MODULAR BRACE FOR SHAFT LINER RETENTION

Filed May 2, 1968

INVENTOR.
GILBERT F. CHESNOV

BY Harry M. Saragovitz
Edward J. Kelly, Herbert Berl
& S. Dubroff
ATTORNEYS

United States Patent Office 3,488,965
Patented Jan. 13, 1970

3,488,965
MODULAR BRACE FOR SHAFT LINER
RETENTION
Gilbert F. Chesnov, 116 Richard St.,
Dover, N.J. 07801
Filed May 2, 1968, Ser. No. 726,046
Int. Cl. E21d 5/02, 11/14; E04b 1/32
U.S. Cl. 61—41         6 Claims

ABSTRACT OF THE DISCLOSURE

An adjustable annular bracing structure for lined shafts having a plurality of linked modules is positioned adjacent a liner inner peripheral surface.

---

The invention described herein may be manufactured, used, and licensed by or for the Government for government purposes without the payment to me of any royalty thereon.

Excavations into shifting soil generally require some sort of liner to prevent the subsidence of soil therein. Therein liners are frequently made of wood and must be able to withstand appreciable pressures exerted by the soil. Although wooden cross braces are being extensively employed to maintain the integrity of liner structures, they are undersirable because they consume large amounts of space within the liner, thus hampering operations which must be conducted therewithin. Stronger liner materials have been used and sturdier liners fabricated therefrom, however they lack the portability and availability inherent with wooden liners.

It is, therefore, an object of this invention to provide a portable brace for substantially cylindrical shaft liners which brace occupies a minimum of space within the liner.

It is another object of this invention to provide a strong, lightweight modular brace for substantially cylindrical shaft liners.

Other objects, features and advantages will become apparent from the following description taken in conjunction with the accompanying drawings in which.

Figure 1:
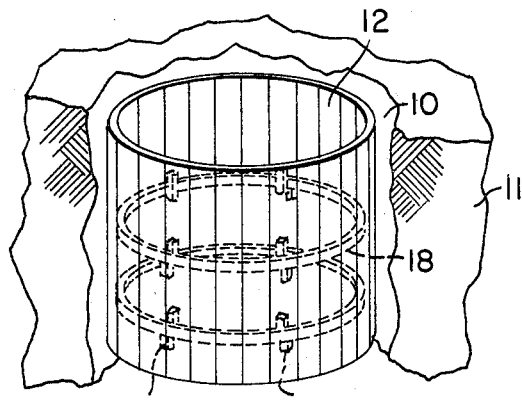
FIG. 1 is a perspective view, partially in section, of a shaft liner embodying the principles of the invention.
Figure 2:
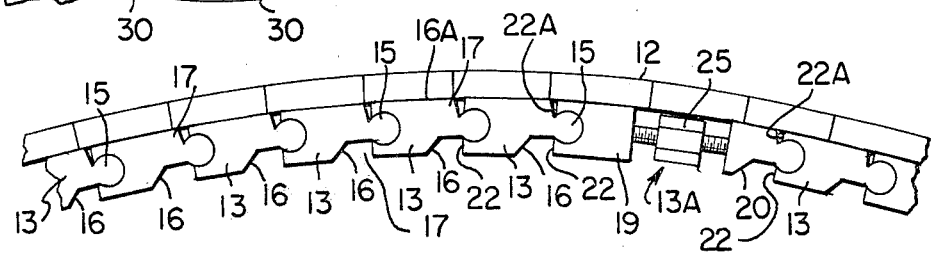
FIG. 2 is an enlarged, top plan view of a portion of the braced shaft liner shown in FIG. 1.

An excavation cavity 10 (FIG. 1) formed in soil 11, is lined by a substantially cylindrical liner structure 12. Liner 12 is preferably made from wood, however other readily available and inexpensive materials may be employed and would provided adequate substitutes. Along the inner peripheral surface of liner 12 are positioned a series of modular bracing members 13 (FIG. 2) which are linked together by tongue and groove portions 14 and 15 to define an annular or ring-like brace 18 (FIG. 1). The number of longitudinally spaced annular braces required will depend on such things as the inherent strength of the shaft liner, the depth of the shaft, and other factors, however one skilled in the art of constructing such liners can readily be expected to make this determination.

Linked to members 13 at predetermined or selected intervals are expanders or adjustable links, shown generally at 13A (FIGS. 2, 4), having tongue and groove portions 20 and 19. At least one such expander is required to adjust the brace to fit the inner periphery of the liner, however three or more substantially equally spaced expanders are preferably used. The expanders are adjustable so that compensation may be made for dimensional changes in the shaft liner shape which may occur due to shifting soil.

Figures 3, 4:
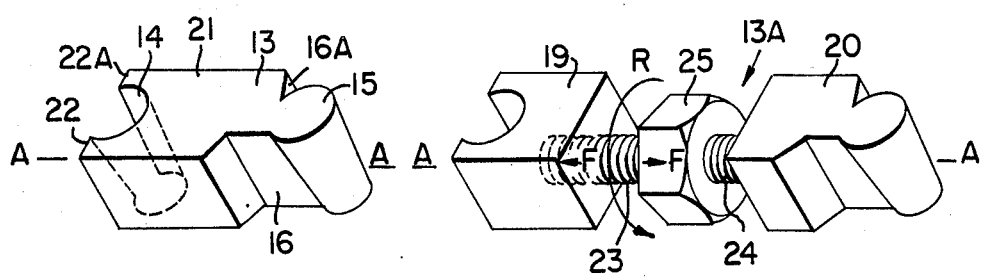
FIG. 3 is an enlarged perspective view of an individual brace link employed in the FIG. 2 arrangement.
FIG. 4 is an enlarged perspective view of an adjustable expander component or link employed in the FIG. 2 arrangement.

In describing the components of brace 18, it may be see from FIG. 3 that member 13 is substantially rectangular and is elongated along its longitudinal axis A—A. In one end of member 13, transverse to axis A—A and orthogonal or perpendicular to upper surface 21, is a right conical groove 14. The transverse central axis of groove 14 is preferably located slightly forward of the rearmost edges 22, 22A of link 13. This groove location permits one member 13 to grip a tongue portion of a mating or adjacent member in a manner to prevent relative longitudinal movement.

At the other end of member 13, orthogonal to surface 21 and transverse to axis A—A, is located a forward protuberance or projection in the form of a right conical tongue 15. Tongue 15 is dimensioned to be slidably received in a similarly shaped groove of a mating or forwardly adjacent member. Member 13 is recessed adjacent tongue 15 to form longitudinally tapering or inclined surface 16. This recess provides a clearance space 17 between surface 16 of one member and surface 22 of a mating or forwardly adjacent member. Clearance 17 allows members 13 to be angularly orientated relative each other so that they can readily conform to the desired inner liner curvature and may be used in small and large diameter liners with equal facility, within the limits permitted by the corresponding outer opposed surfaces 16A, 22A that contact each other upon inward radial pressure to prevent brace bucking or collapse. Surfaces 16A, 22A are slightly spaced circumferentially to permit a small reverse angular rotation to facilitate imperfect circumferential excavation.

Expander members or bodies 19 and 20 (FIG. 4) may be formed by dividing or bisecting a member 13 transversely of axis A—A. This will yield a first grooved body 19 and a second tongued body 20 which are dimensionally identical with similar portions of members 13. Threadedly secured to body 19 is a stud 23 which is integral with nut 25. Stud 23 has right hand threads and extends rearwardly along its longitudinal axis A—A. Threadedly secured to body 20 is a rearwardly extending nut stud 24 having left hand threads and extending forwardly along axis A—A. Thread size and stud diameters for both studs 23, 24 are preferably of equal dimensions or design and their corresponding threadedly attached expander bodies 19, 20 are appropriately provided with longitudinally extending internal threads to accommodate the desired adjustments of bodies 19, 20 upon predetermined turning or rotation of nut 25 in a turnbuckle-like manner.

In military bomb excavation operations the presence of ferrous materials may initiate buried magnetically fuzed ammunition. Also the presence of ferrous materials will interfere with certain electronic equipment used for locating buried ordnance. Aside from these special cases, there is no restriction on the type of material from which the modular members may be fabricated.

To facilitate a single person in assemblying each modular brace arrangement, a shelf may be easily constructed by circumferentially positioning a few hangers 30 (FIG. 1) onto the liner material 12 to support brace portions until the expanders are adjusted. The hangers may then be removed, if desired.

After the excavation of a shaft and the construction of a liner therein, annular brace 18 may be assembled within the liner. This is accomplished by downwardly inserting tongues 15 into grooves 14 of successively mating members 13. At about three spaced intervals, expanders are linked to members 13 in a similar fashion. Assembly is continued until an annular structure is formed which closely fits the inner peripheral surface of the liner; then adjusting nuts 25 on the expanders are rotated to urge members 19 to brace the shaft liner against forces created by shifting soil. If desired, other structures may be placed in the liner at preselected intervals to produce a braced liner which possesses good structural integrity and relatively unrestricted working space.

While a preferred embodiment of the invention has been described in detail, various modifications, changes and alterations may be resorted to without departing from the scope of the invention as defined by the appended claims.

I claim:
1. A modular structure for bracing a shaft wall liner comprising:
   a plurality of substantially rectangular elongated members each having an integral tongue and a groove portion located at opposite ends thereof and extending along its member longitudinal axis; said members linked together successively by having said groove portions correspondingly receiving respective tongue portions of mating members to define a ring-like structure, and
   at least one expander linked intermediate a selected adjacent pair of said members and having a first body provided with a groove portion receiving an adjacent member tongue portion, a second body having a tongue portion swively secured in another adjacent member groove portion, and means positioned intermediate said bodies for urging said bodies apart,
   so constructed and arranged that said linked members and expander can provide a ring-like support when in intimate contact with an inner surface of said liner.

2. The structure of claim 1 wherein said tongue and groove portions of said members and expander are conically shaped.

3. The structure as defined in claim 1 wherein each of said members has a conically shaped groove portion at a rearward end thereof, with said groove portion having a central axis located forwardly of said rearward end and positioned orthogonal to said member longitudinal axis; a conically shaped tongue portion at each member forward end with said tongue portion having a central axis orthogonal to said member longitudinal axis; each of said members having a recessed sidewall portion integrally connecting its tongue and groove portions, each tongue having at least one-half its forward peripheral surface in engagement with a groove portion of a mating member, said recessed sidewall portion providing a clearance between adjacent mating members for angularly orientating said members relative to each other.

4. The structure as defined in claim 1 wherein said second body has a recessed sidewall adjacent said tongue portion, said recessed sidewall providing a clearance for angularly orientating said second body relative to said other adjacent member groove portion.

5. The structure of claim 1 wherein said urging means comprises:
   a first stud having right hand threads connected to said first body,
   a second stud having left hand threads connected to said second body,
   an elongated nut having right hand threads, said nut being in engagement with said threads, with said threads and nut cooperating to provide relative longitudinal movement to said bodies upon rotation of said nut.

6. The structure as defined in claim 1 wherein said ring-like liner support has a plurality of expanders spaced at predetermined intervals and linked intermediate adjacent pairs of said members.

References Cited

UNITED STATES PATENTS

| | | | |
|---|---|---|---|
| 471,629 | 3/1892 | Vetter | 61—40 X |
| 1,036,680 | 8/1912 | Moran | 61—40 |
| 1,152,174 | 8/1915 | Hamilton | 52—245 |
| 3,102,367 | 9/1963 | Pederson et al. | 52—245 X |

FOREIGN PATENTS

| | | |
|---|---|---|
| 537,857 | 3/1922 | France. |
| 658,732 | 4/1938 | Germany. |

JACOB SHAPIRO, Primary Examiner

U.S. Cl. X.R.

52—245, 594; 61—45; 287—20.92